US012567137B1

(12) United States Patent
DesRosiers et al.

(10) Patent No.: US 12,567,137 B1
(45) Date of Patent: Mar. 3, 2026

(54) PROCESS FOR VALIDATING USER ASSESSMENT OF EQUIPMENT

(71) Applicant: Samsara Inc., San Francisco, CA (US)

(72) Inventors: Reed Phillip DesRosiers, San Francisco, CA (US); Joseph Kovach, Mill Valley, CA (US); Ashcon Zand, Philadelphia, PA (US); Ikechukwu Muyiwa Eshiokwu, Toronto (CA); Ho Chi Andrew Chin, Miami, FL (US); Ehsan Joseph Razfar, San Francisco, CA (US); Xiaodong Tian, Issaquah, WA (US); Matthew Lee Basham, Oakland, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 19/236,536

(22) Filed: Jun. 12, 2025

(51) Int. Cl.
*G06T 7/00* (2017.01)
*G06F 16/583* (2019.01)
*G06F 16/587* (2019.01)

(52) U.S. Cl.
CPC .......... *G06T 7/0004* (2013.01); *G06F 16/583* (2019.01); *G06F 16/587* (2019.01)

(58) Field of Classification Search
CPC .... G06T 7/0004; G06F 16/583; G06F 16/587
See application file for complete search history.

(56) References Cited

U.S. PATENT DOCUMENTS 9,141,618 B2 * 9/2015 Boldyrev ............. H04N 21/858
9,681,111 B1 * 6/2017 Newman ............. G11B 27/034

2012/0290916 A1 * 11/2012 Parekh ................. G06F 16/172
715/234
2014/0236953 A1 * 8/2014 Rapaport ............. G06F 16/285
707/740
2015/0113039 A1 * 4/2015 Laurikari ................ H04L 67/52
709/202
2015/0117786 A1 * 4/2015 James ....................... G06T 7/11
382/195
2016/0203141 A1 * 7/2016 Sabah ................... G06F 16/583
707/739
2016/0259858 A1 * 9/2016 Vittorio ............... G06F 16/9535
2017/0123982 A1 * 5/2017 Haven ................. G06F 12/0813
2017/0169128 A1 * 6/2017 Batchu Krishnaiahsetty .............
H04N 21/8456
2017/0185364 A1 * 6/2017 Cameron ................. G09G 5/12
2020/0389602 A1 * 12/2020 Dawson ............... G06F 1/1694
2021/0123757 A1 * 4/2021 Lee .......................... G06N 3/02
2022/0109724 A1 * 4/2022 Menon ............... H04L 67/1097

* cited by examiner

*Primary Examiner* — Mia M Thomas
(74) *Attorney, Agent, or Firm* — Schwegman Lundberg & Woessner, P.A.

(57) ABSTRACT

A technique for quality enforcement in equipment inspection processes through automated validation of user assessment data can involve receiving evaluator user data, including the present location of an evaluator device and evaluator credentials, and receiving user assessment data regarding the condition of specified equipment. Evaluator user data can be compared with the location data corresponding with the specified equipment, to yield a determination, based on the comparison, an indication of an accuracy of the user assessment data of the condition of the specified equipment. Such a technique can help ensure that equipment inspections are conducted with appropriate rigor and accuracy by implementing multiple layers of verification and quality control measures.

15 Claims, 11 Drawing Sheets

1000

RECEIVE EVALUATOR USER DATA — 1002

RECEIVE USER ASSESSMENT DATA OF A CONDITION OF SPECIFIED EQUIPMENT — 1004

GENERATE A COMPARISON OF THE EVALUATOR USER DATA WITH THE LOCATION DATA CORRESPONDING WITH THE SPECIFIED EQUIPMENT — 1006

DETERMINE, BASED ON THE COMPARISON, AN INDICATION OF AN ACCURACY OF THE USER ASSESSMENT DATA OF THE CONDITION OF THE SPECIFIED EQUIPMENT — 1008

PROCESS FOR VALIDATING USER ASSESSMENT OF EQUIPMENT

BACKGROUND

Equipment inspection and assessment procedures are fundamental components of operational safety and regulatory compliance across various industries. In transportation, construction, and industrial sectors, certain operators are required to conduct regular inspections of vehicles, machinery, and other critical equipment to ensure safe operation and adherence to corresponding regulatory standards.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
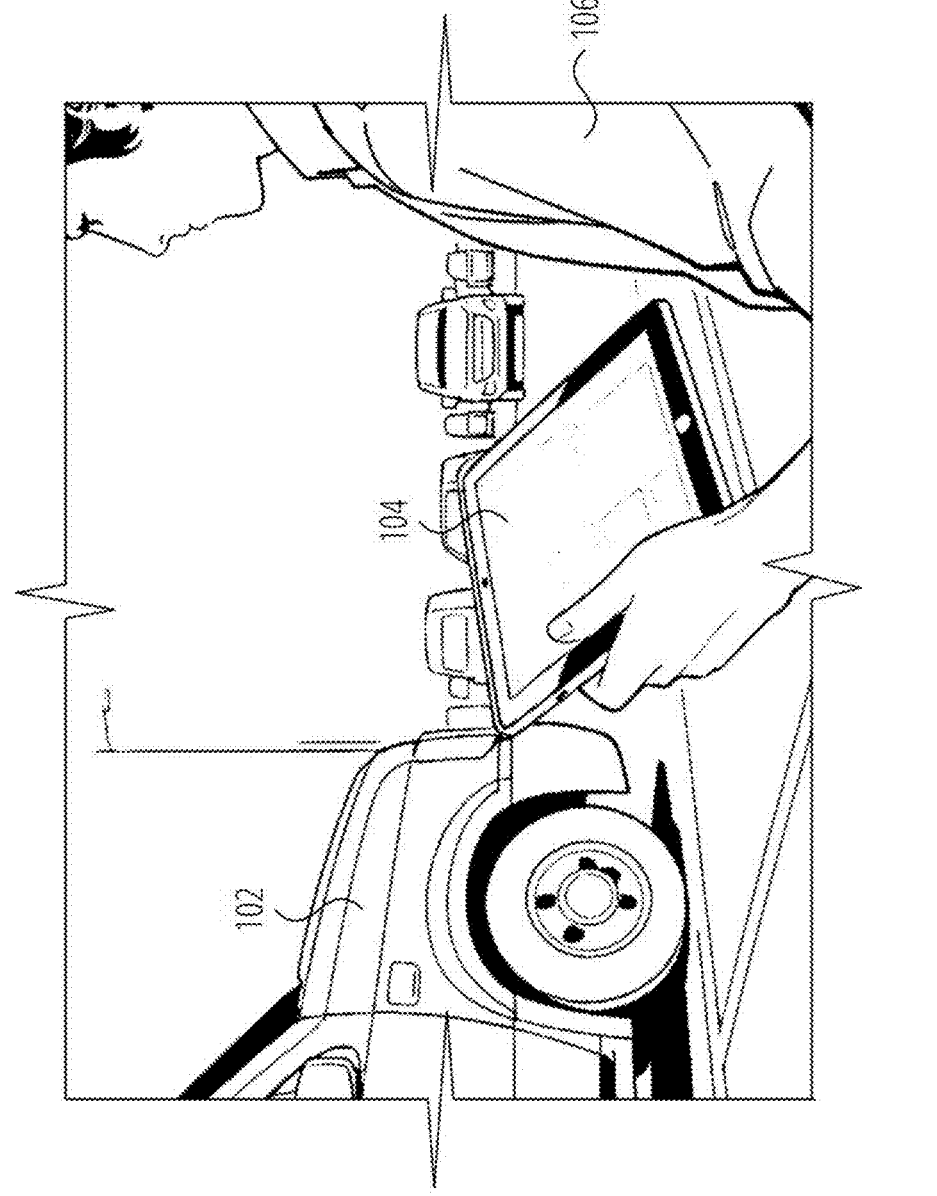
FIG. 1 depicts an example of a user assessment being performed on equipment.

In certain industries, equipment inspection processes typically involve manual documentation where operators record their observations and assessments of equipment condition through written reports or digital forms. These inspection procedures can involve operators physically examining equipment components, document any defects or maintenance needs, and maintain records for compliance purposes. Certain approaches to equipment evaluation involve digital technologies to streamline data collection and documentation processes. For example, an operator or other evaluator can utilize mobile devices to capture multimedia content such as photographs during inspections, enabling visual documentation of equipment conditions. The regulatory landscape governing equipment inspections varies by industry and jurisdiction. In the transportation sector, agencies such as the Federal Motor Carrier Safety Administration (FMCSA) establish requirements for vehicle inspections, while the Occupational Safety and Health Administration (OSHA) regulates inspection procedures for various types of industrial equipment and machinery. These regulatory frameworks establish minimum standards for inspection frequency, documentation requirements, and operational compliance. In certain instances where operators fail to notice issues (e.g., a brake malfunction of a vehicle) they risk vehicle failure that can result in personal injury, property damage, etc. Certain poor inspection practices can attribute to such failure to notice issues, and additionally can attribute to increased equipment maintenance costs, as proactive identification of issues prevents more expensive breakdowns and emergency repairs.

The present inventors have recognized the benefits of a technique for quality enforcement in equipment inspection processes through automated validation of user assessment data. Such a technique can help ensure that equipment inspections are conducted with appropriate rigor and accuracy by implementing multiple layers of verification and quality control measures.

A process for quality enforcement in equipment inspection processes can involve receiving evaluator user data, including the present location of an evaluator device and evaluator credentials, and receiving user assessment data regarding the condition of specified equipment. Such user assessment data can include multimedia content of the specified equipment and location data corresponding with the equipment being inspected. The process can involve generating a comparison between the evaluator user data and the location data corresponding with the specified equipment, and determines, based on this comparison, an indication of the accuracy of the user assessment data. Such a process can involve determining whether user assessment data meets at least one data collection standard, which can include specified recency requirements for multimedia metadata corresponding with the captured multimedia. Such aspects can help dissuade certain operators, e.g., from reusing old photographs taken on previous days while located remotely (e.g., in an office), such as to dissuade actions possibly attributing to inspection noncompliance.

Certain approaches to overseeing a group of drivers, such as via a supervisor in a fleet management paradigm, can involve a database for including data corresponding to each driver (e.g., telemetry data, vehicle sensor data, gas mileage, driving record, etc.). Certain other approaches to overseeing equipment inspections from multiple evaluators can be generally disorganized or otherwise very difficult to review objectively. Systems and processes described herein can help mitigate such issues, e.g., allowing an overseeing end user to compare drivers within the group, recognize trends in group or individual driving habits, identify positive driving habits, or to notice situations where corrective action may promote better future driving.

FIG. 1 depicts an example of a user assessment being performed on equipment.

Certain authorities, such as the Federal Motor Carrier Safety Administration (FMCSA) can oversee pre-trip inspections on commercial vehicles, and failure to comply can result in certain financial penalties during roadside inspections. Similarly, the Occupational Safety and Health Administration (OSHA) regulates inspection requirements for various types of heavy equipment beyond vehicles, including forklifts, cranes, backhoes, and other industrial machinery. For example, vehicle operators 106 (e.g., a driver) in certain industries must inspect their vehicles 102

(e.g., daily) before driving. It can be challenging for such vehicle operators to consistently comply with such regulations, and certain industry pressures can place the onus of completing inspection requirements on certain vehicle operators 106, sometimes conflicting with other objectives imposed by their superiors. Such a dynamic could lead such vehicle operators 106 to engage in "pencil whipping", where the vehicle operator technically completes the inspection paperwork while sitting in an office or a truck cab yet without actually walking around and examining the equipment according to the inspection requirements. Systems and methods described herein can help avoid or reduce pressures on vehicle operators 106 and other equipment inspectors to circumvent certain inspection requirements, such as to ease and encourage behavior compliant with requirements from the FMCSA, OSHA, and other authorities.

In an example, the vehicle operator 106 can complete an inspection report on a mobile device 104, such as a phone, tablet, laptop, etc. The mobile device 104 can facilitate (e.g., via instructions displayed to the vehicle operator 106) a routine where the driver walks around the vehicle and takes several images and provides written or dictated accounts of a present state of various components of their associated vehicle 102. During the routine, the mobile device 104 can facilitate a comparison, such as to assure whether the mobile device 104 is located with where the vehicle 102 (or other equipment being inspected) actually is, such as using GPS and telematics data. Such a comparison can help encourage the vehicle operator 106 to remain physically present with the relevant equipment while meeting the inspection requirements.

While the vehicle operator 106 is performing the routine, such as capturing images according to various prompts provided by the mobile device 104, the mobile device 104 can facilitate use of a machine learning (ML) model to help verify that the captured images were correctly captured according to their corresponding prompt. For example, if the vehicle operator 106 must photograph the driver's side of the vehicle 102 but instead takes a picture of the front of the vehicle 102, the mobile device 104 can provide a warning or other prompt to facilitate a correction. The mobile device can also facilitate validating certain metadata associated with the captured images (e.g., timestamp data), such as to dissuade certain vehicle operators 106 from reusing old pictures taken on previous days.

In an example, the mobile device 104 can facilitate display of an overall quality score (e.g., to the vehicle operator 106 or a corresponding supervisor), the quality score indicative of whether the inspection meets appropriate inspection standards. Generally, the mobile device 104 and associated software can allow the vehicle operator 106 to submit a substandard inspection (e.g., possibly noncompliant or rated with a low overall quality score). Such an approach recognizes there may be legitimate operational reasons to proceed with submission of, e.g., a Driver Vehicle Inspection Report (DVIR) despite shortcomings. Instead, measures and indications of inspection quality can be used to alert a vehicle operator's 106 supervisors, e.g., when certain quality standards aren't met and encourage coaching or other remediation. In an example, the vehicle 102 can include any types of trucks, vans, cars, construction equipment, forklifts, etc. Additionally, systems and methods described herein can be used to facilitate compliance in inspecting other construction, agriculture, or other industrial equipment such as trailers, cranes, tractors, chainsaws, etc.

Figure 2:
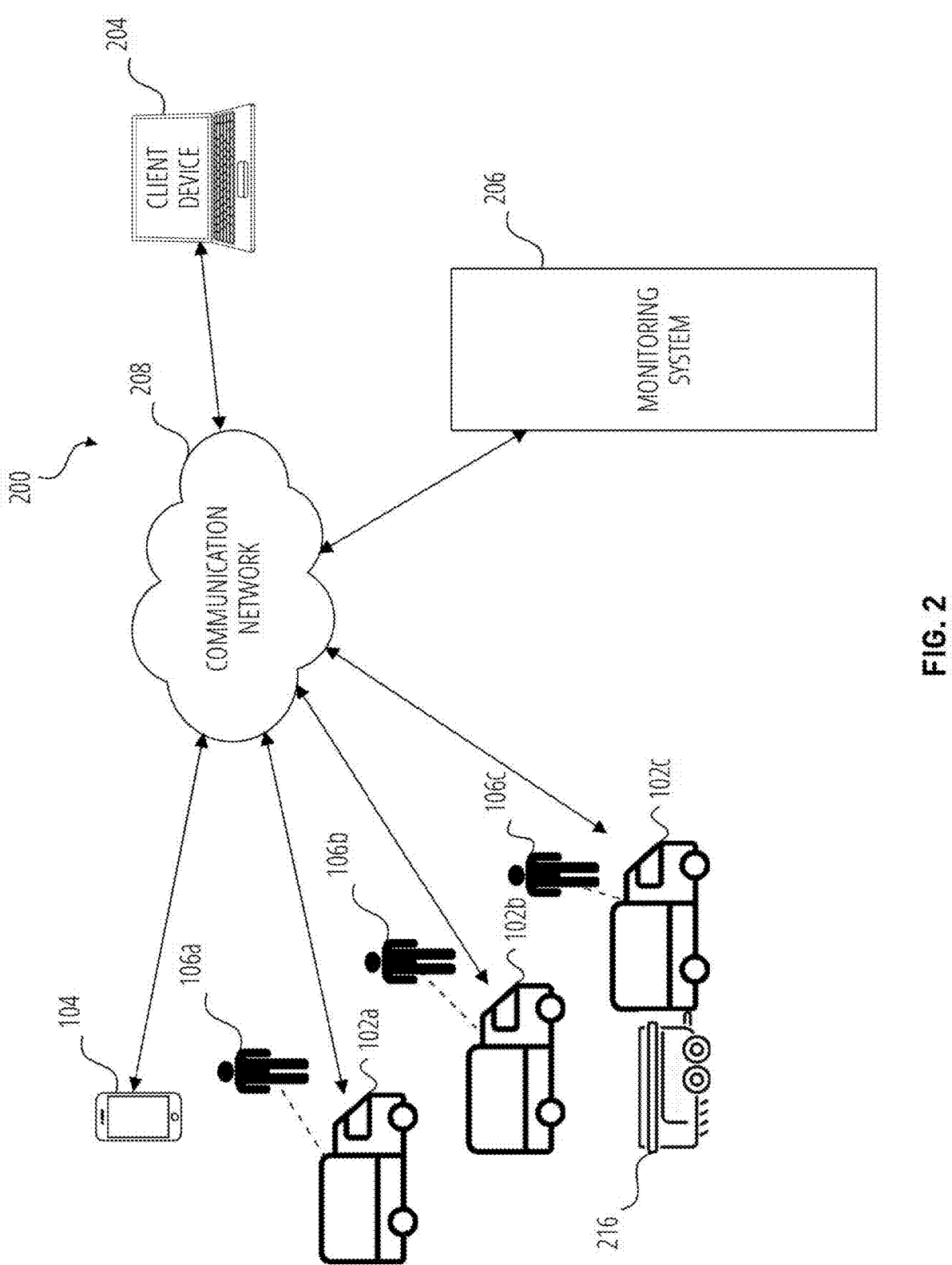
FIG. 2 depicts an example of a system for validating user assessment of equipment.

FIG. 2 depicts an example of a system for validating user assessment of equipment. As shown, multiple devices (e.g., a plurality of vehicles 102a, 102b, and 202c, trailer 216, client device 204, and monitoring system 206) are connected to a communication network 208 and configured to communicate with each other through the communication network 208. The communication network 208 is any type of network, including a local area network (LAN), such as an intranet, a wide area network (WAN), such as the internet, a mobile telephone network, a satellite communications network, or any combination thereof. The communication network 208 is implemented using any number of communication links associated with one or more service providers, including one or more wired communication links, one or more wireless communication links, or any combination thereof.

The plurality of vehicles 202 can be any type of vehicle or combination vehicle, such as an automobile, semi-trailer truck, trailer, plane, train, ship, and the like. Further, the techniques presented herein may be used with other non-moving assets that are operated by an operator (e.g., cranes, manufacturing equipment, call centers) and assets that are controlled remotely (e.g., drones, air traffic controllers). The examples described herein should therefore not be interpreted to be exclusive or limiting, but rather illustrative.

Each of the plurality of vehicles 202 can transmit data, such as sensor data gathered by respective sensors arranged thereon, to a remote computing device. For example, each of the plurality of vehicles 202 can be equipped with a variety of sensors that capture data describing the performance of the vehicles 202, actions performed by corresponding riders in and around the vehicles 202, and an individual vehicle's surrounding environment.

The monitoring system 206 is a computing system consisting of one or more computing devices configured to provide remote behavioral monitoring of the plurality of vehicles 202, such as to detect vehicle location, vehicle component condition (e.g., a state of one or more vehicle filters), or other indications of vehicle maintenance or condition. In an example, the monitoring system 206 may allow a user, such as a fleet manager administrator, to define a set of triggering conditions and criteria for detecting vehicle maintenance activities or vehicle condition.

To utilize the functionality of the monitoring system 206, end users (e.g., administrators and fleet managers) may use the client device 204. In an example, the monitoring system 206 can concurrently accept communications from and initiate communication messages and interact with any number of client devices 204 and vehicles 202, and support connections from a variety of different types of client devices 204.

An end user may interact with the monitoring system 206 via a client-side application installed on the client device 204. In some examples, the client-side application includes a component specific to the monitoring system 206. For example, the component may be a standalone application, one or more application plug-ins, or a browser extension. However, the users may also interact with the monitoring system 206 via a third-party application, such as a web browser or messaging application, that resides on the client device 204 and is configured to communicate with the monitoring system 206. In either case, the client-side application presents a user interface (UI) for the user to interact with the monitoring system 206.

The monitoring system 206 can provide a UI that allows administrators to configure the triggering conditions. Each triggering condition defines one or more individual conditions that, if satisfied, indicate the occurrence of a maintenance event, an indication of a vehicle component needing repair, etc. For example, a triggering condition may be satisfied when a vehicle computing system detects an electrical short or a voltage drop from a battery (e.g., indicating corrosion at or near battery terminals. As another example, a triggering condition may include vehicle calculations of fuel efficiency, acceleration, or other metrics indicative of vehicle health.

The user interface also enables the administrators to define corresponding actions to be performed in the event that a triggering condition has been satisfied/triggered. For example, the user interface enables the administrator to define contact identifiers (e.g., email addresses, phone numbers, etc.) to which notifications are to be sent.

As described further below with respect to FIG. 3, FIG. 4, FIG. 5, FIG. 6A, FIG. 6B, FIG. 7A, and FIG. 7B, a driver 106a, 106b, or 106c (or a corresponding driver identifier, such as a user profile or account number) may interact with the monitoring system 206 and the AMS 210, e.g., via a mobile device 104. A monitoring application can execute on the mobile device 214 and connect (e.g., via wireless communication such as cellular, WiFi, or Bluetooth) to a corresponding vehicle 102a, 102b, or 102c, and the behavioral monitoring system 206 to perform operations related to the monitoring system 206, such as performing an inspection of their corresponding vehicle 102a, 102b, or 102c, or other equipment. Alternatively, the driver 102 may access similar functionality via a web browser executing on the mobile device 214.

Figure 3:
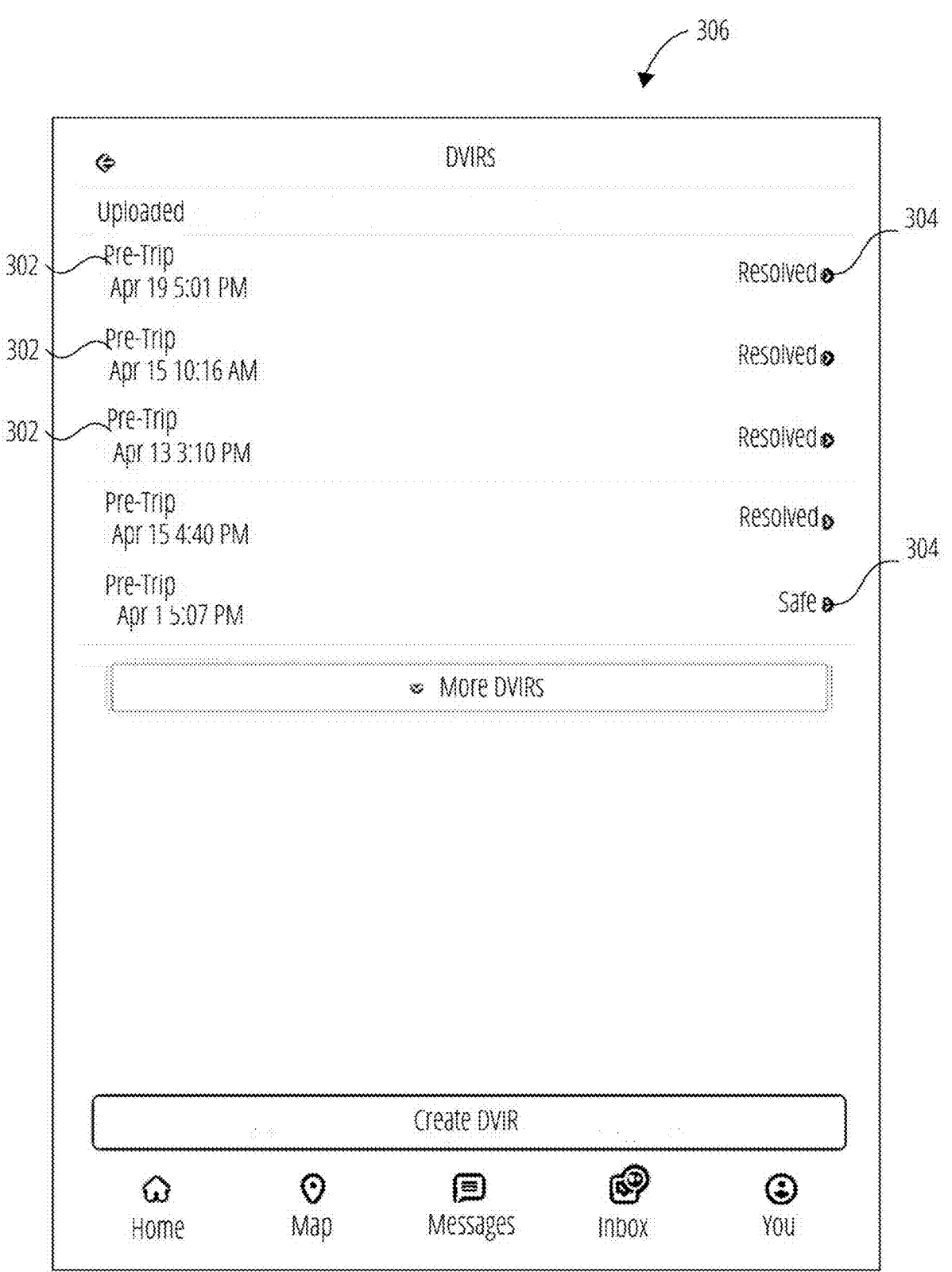
FIG. 3 depicts an electronic driver vehicle inspection report (DVIR) log.

FIG. 3 depicts an electronic driver vehicle inspection report (DVIR) log. In an example, a user interface (UI) of the mobile device 104 (e.g., as depicted in FIG. 1 and FIG. 2) can display a DVIR log 306, showing a plurality of DVIRs 302. The DVIR log 306 can include a chronological listing of the DVIRs 302, including completed and upcoming DIVRs, and corresponding indicators 304 of whether a certain DVIR has been completed (e.g., according to minimal completion standards for an inspection report.

Figure 4:
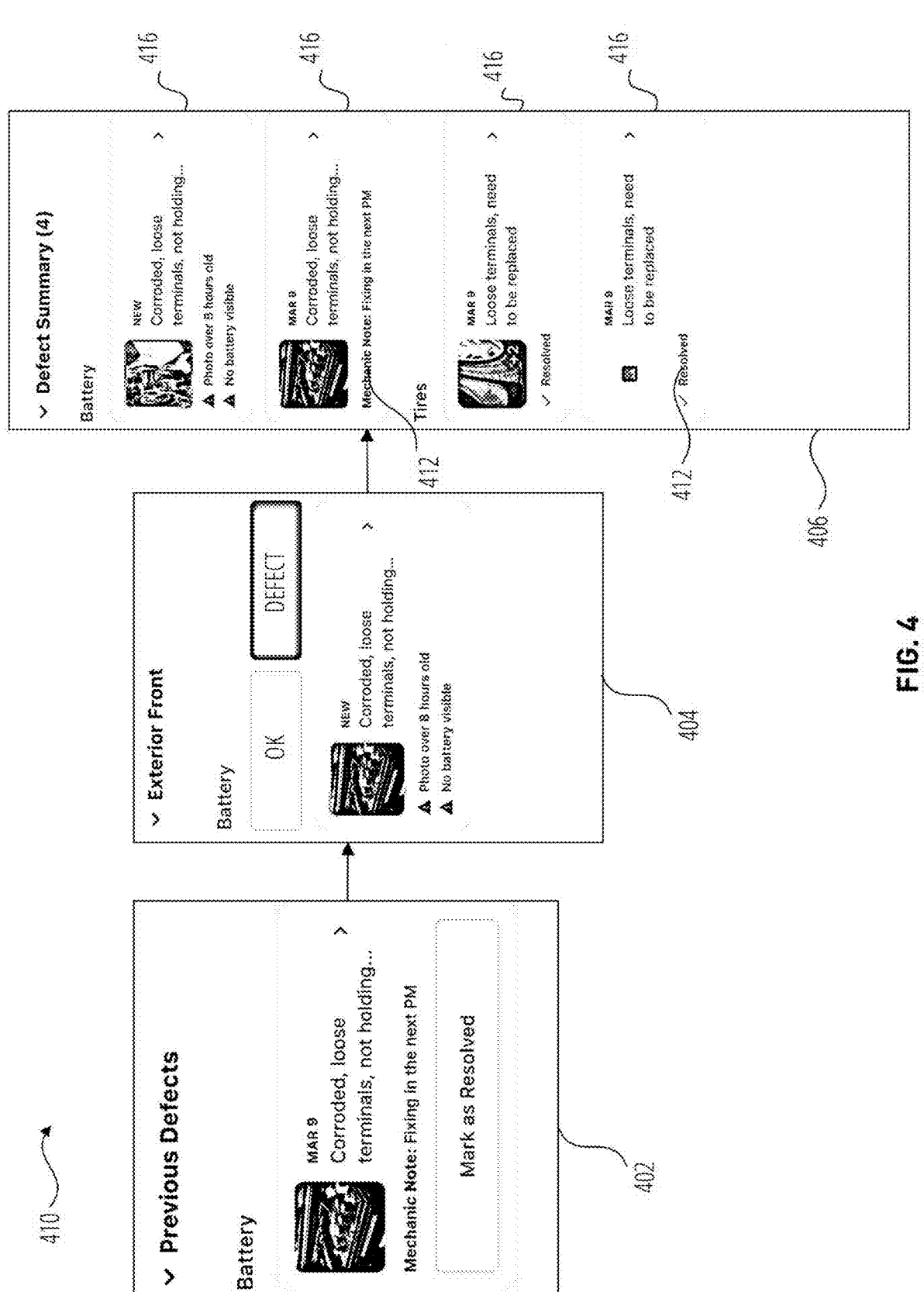
FIG. 4 depicts a process for identifying defects of equipment.

FIG. 4 depicts a process for identifying defects of equipment. In an example, a vehicle operator (e.g., as depicted in FIG. 1 and FIG. 2) can access a routine 410 (e.g., via the UI of the mobile device 104) for performing an image capture procedure of a vehicle inspection. At 402, the routine 410 can provide to the vehicle operator an indication of any previous defects (e.g., a defect indicated on a previous DVIR) and request the vehicle operator to provide information on whether a specified previous defect has since been resolved (e.g., repaired or otherwise mitigated. At 404, the routine 410 can receive from the vehicle operator an indication of a present defect, e.g., recognized by the vehicle operator during the present inspection. Here, the routine can involve prompting the vehicle operator to capture an image of the present defect, e.g., to help document the defect and provide for subsequent repair or diagnosis. At 406, the routine 410 can provide a defect summary, providing a listing of historical defects 416 of the vehicle. For example, the routine 410 can provide each defect and an indication of defect status 412, e.g., showing whether the defect has been resolved or a plan or strategy for resolution.

Figure 5:
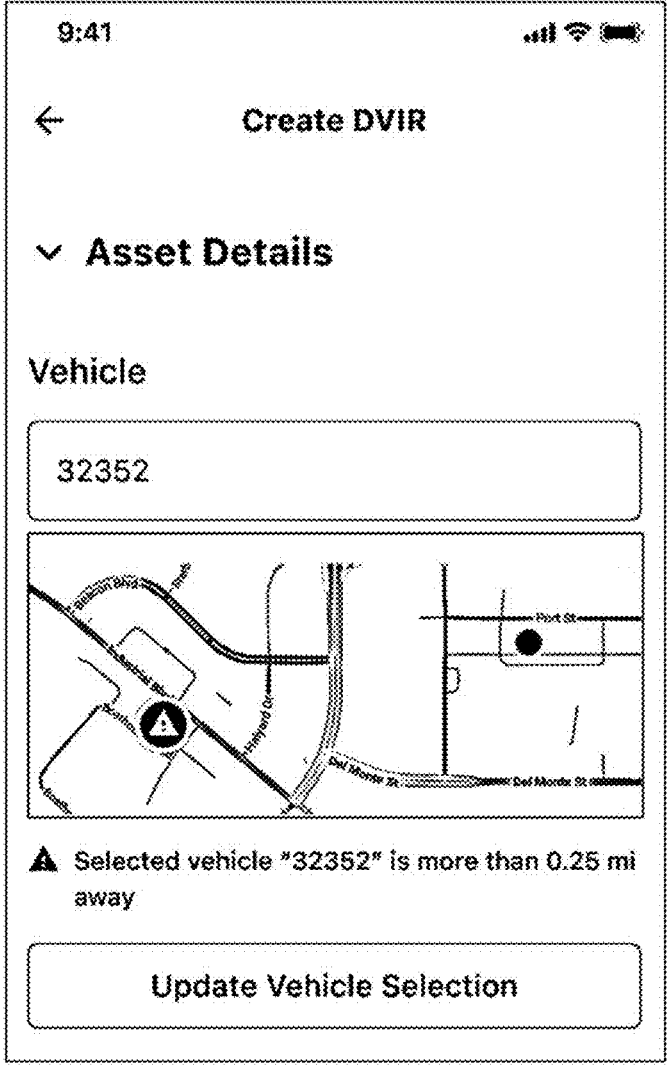
FIG. 5 is an example of a User Interface (UI) for user assessment of equipment.

FIG. 5 is an example of a User Interface (UI) for user assessment of equipment. In an example, during a vehicle inspection (e.g., concurrent with an end user performing the routine 410 as shown in FIG. 4), The system can validate whether the mobile device 104 (e.g., as depicted in FIG. 1 and FIG. 2) is at the correct location by comparing the device's present location with the known location of the specified equipment. For example, such a comparison can be calculated (e.g., via any of the mobile device 104, the monitoring system 206, the client device 204, or a third party service connected via the communication network 208 of FIG. 2) via interpolation or comparison of telematics data. Such a location-based verification can help facilitate that operators are actually present at the equipment they purport to be inspecting.

Figure 6B:
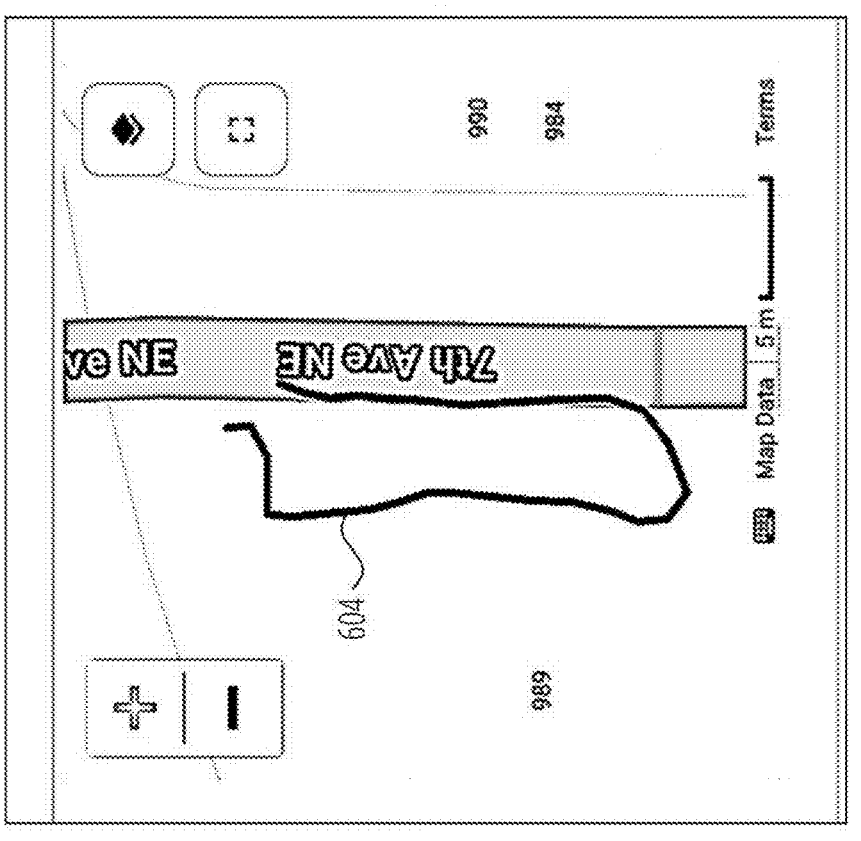
FIG. 6B depicts a walkaround path corresponding with the guided image capture of FIG. 6A.
Figure 6A:
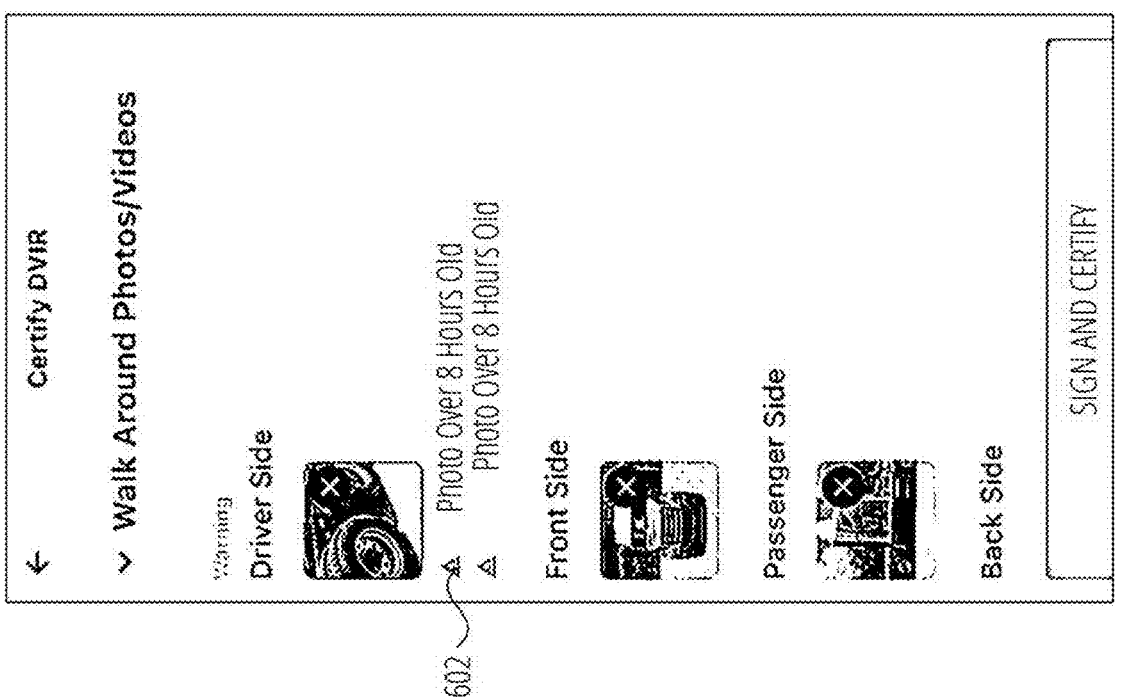
FIG. 6A is an example of a User Interface (UI) for user assessment of equipment, including guided image capture.

FIG. 6A is an example of a User Interface (UI) for user assessment of equipment, including guided image capture. In an example, (e.g., during the routine 410 as shown in FIG. 4), the mobile device can facilitate multimedia metadata validation to ensure that images being submitted with an inspection report are being captured in real time and not, e.g., recycled images of the correct equipment or artificial images captured elsewhere. For example, the mobile device can provide certain image metadata, e.g., Exchangeable Image File Format (EXIF) files for verification of a recency of captured images. For example, where a vehicle operator attempts to select a photo from their device's photo library, the system accesses and analyzes the EXIF metadata to determine when the photo was actually taken and provide a warning 602 if the selected photo is not within an acceptable timeframe for submission (e.g., <1 hour from submission, <30 minutes from submission, <15 minutes from submission, <5 minutes from submission, etc.), ensuring that only recently captured images are ultimately submitted for inspection documentation.

Further, the mobile device can facilitate validating a presence of specified items or specified item viewpoints within the multimedia content. For example (as explained further with respect to FIG. 9) the mobile device can facilitate use of a trained machine learning model, e.g., using user captured images as an input to determine whether the specified item is present and whether the specified item is shown according to the specified item viewpoint. For example, if a vehicle operator is requested to photograph a driver side of a vehicle but instead captures an image of the front of the truck, the mobile device can display a warning 602 that "the driver side is not visible in this photo."

In an example, the mobile device can facilitate that the entire inspection period lasts greater than a specified duration. For example, such duration validation can provide an alternative or additional quality enforcement mechanism, such as to ensures that inspections take an appropriate and expected amount of time (e.g., greater than five to fifteen minutes). Such a validation can dissuade vehicle operators from completing certain vehicle inspections too quickly, which may indicate insufficient thoroughness.

FIG. 6B depicts a walkaround path corresponding with the guided image capture of FIG. 6A. In an example, the mobile device can facilitate location-based validation via walkaround path analysis. Here, any of the mobile device 104, the monitoring system 206, the client device 204, or a third party service connected via the communication network 208 of FIG. 2 can receive location data from the mobile device 104, corresponding with the period when the corresponding vehicle evaluator is capturing multimedia content, and interpolate the location data to estimate an evaluator walkaround path 604. Such a walkaround path validation can help ensure a complete walk-around inspection where the operator walks entirely around their vehicle.

Such a comparison process can include mapping images from the multimedia content across the evaluator walkaround path 604 (e.g., based on multimedia metadata), and determining whether each image was captured at or near an expected position along the walkaround path 604.

Figure 7B:
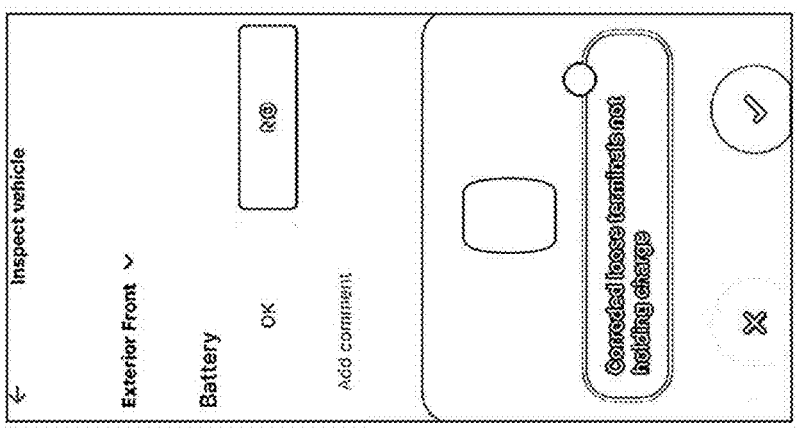
FIG. 7B is an example of a User Interface (UI) for user assessment of equipment, including voice-to-text dictation of observed equipment condition.
Figure 7A:
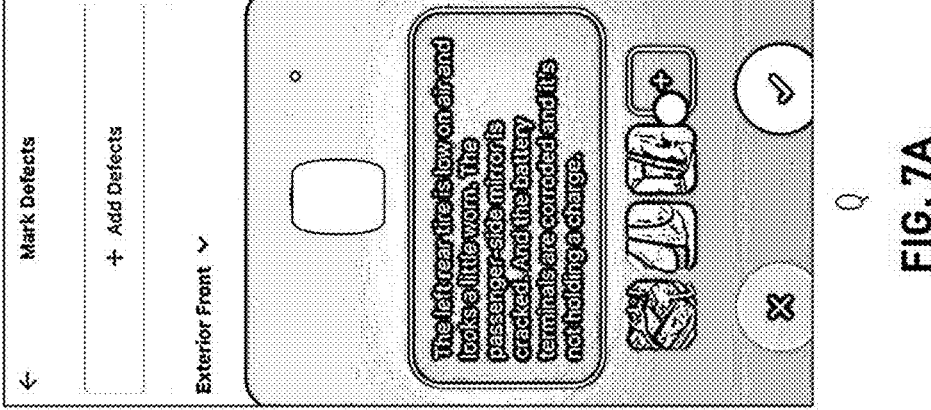
FIG. 7A is an example of a User Interface (UI) for user assessment of equipment, including voice-to-text dictation of observed equipment condition.

FIG. 7A and FIG. 7B each show an example of a User Interface (UI) for user assessment of equipment, including voice-to-text dictation of observed equipment condition. In an example, the mobile device can facilitate speech-to-text functionality for defect reporting, allowing vehicle operators to speak defect descriptions into their mobile devices. The system can automatically parse spoken descriptions of multiple defects—such as "my battery is broken, my windshield is cracked, and my side view mirror is broken"—and automatically populate separate form fields (e.g., for filling out a DVIR) corresponding with each identified defect.

Figure 8:
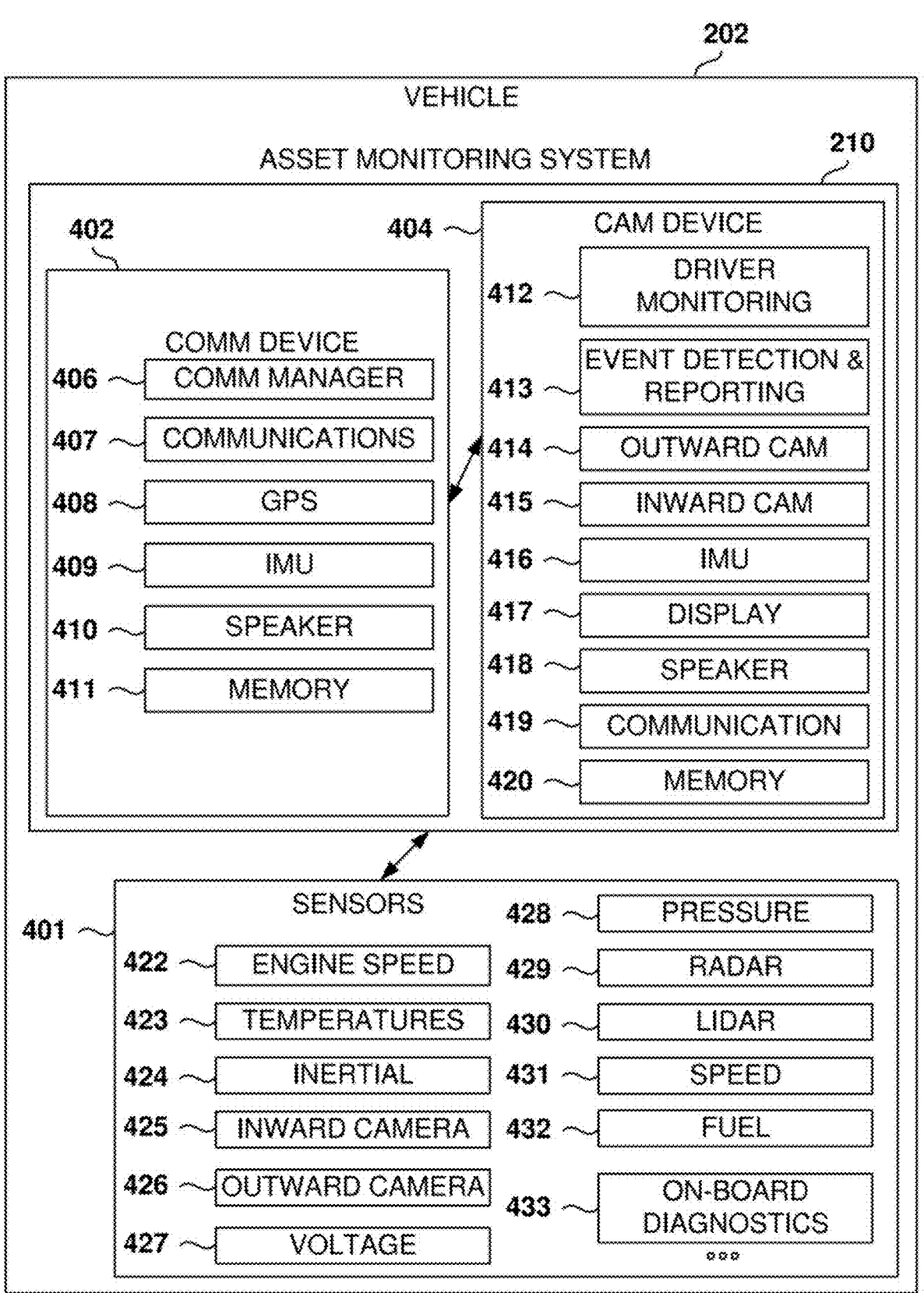
FIG. 8 depicts certain components of an example of a vehicle for use in validating user assessment of equipment.

FIG. 8 depicts certain components of an example of a vehicle for rider behavioral monitoring. The vehicle 202 can include or use an asset monitoring system (AMS) 210 and a plurality of sensors 401. The AMS 210 may include a single device or distribute its functions across a plurality of devices in the vehicle (e.g., sensors, processors, communications devices) that are able to communicate among themselves. In the illustrated example, the AMS 210 includes a communication (comm) device 402 and a camera (cam) device 404, but other examples may utilize different numbers of devices or distribute their functionality differently.

The comm device 402 provides communication services within the vehicle and the network and may connect to the diagnostic port in the vehicle to gather vehicle information. In some examples, the comm device 402 includes a communications manager 406, a communications module 407, a Global Positioning System (GPS) 408, an Inertial Measurement Unit (IMU) 409, a speaker 410, computer memory 411 (RAM and permanent storage), and one or more processors (not shown). The GPS 408 and the IMU 409 may be used, together or separately, to calculate the speed of the vehicle.

The communications manager 406 coordinates communications with the BMS and other devices in the vehicle, such as the cam device 404. The communications module 407 provides one or more communication interfaces, such as mobile telephony, satellite communications, WiFi, Bluetooth, etc. Further, the communications manager 406 may provide a WiFi hotspot to other devices in the vehicle so these devices can communicate to the network via the WiFi hotspot.

The IMU 409 sensor detects the motion and orientation of the vehicle, and the memory 411 stores data collected during the operation of the vehicle and programs that may be executed on the comm device 402.

In some examples, the cam device 404 includes a driver monitoring module 412, an event detection and reporting system 413, an outward camera 414 that captures images in the direction of travel, an inward camera 415 that captures images of the vehicle cabin, an IMU 416, a display 417 (e.g., a touchscreen, computer display, LED lights), a speaker 418, a communications module 419, a memory 420, and a processor (not shown). The inward camera 415 is installed within the vehicle cabin to monitor the driver and passengers, while the outward camera 414 provides visual information about the environment surrounding the vehicle.

The driver monitoring module 412 performs one or more activities regarding driver behavior, such as LD detection, driving while drowsy, following too close, sudden braking, etc. The event detection and reporting system 413 is configured to identify and log significant events based on sensor data. For example, the event detection and reporting system 413 may detect when the truck is approaching a bridge, and there is a risk of collision. The display 417 provides visual feedback and information to the vehicle occupants, while the speaker 418 provides auditory information or alerts. Further, the memory 420 stores data collected during the operation of the vehicle and programs that may be executed on the cam device 404.

In some examples, the cam device 404 is configured to execute the machine learning models, but other examples may execute the machine learning models in the comm device 402. Other configurations may include additional devices within the AMS 210 or consolidate all functions within a single device.

In some examples, the comm device 402 and the cam device 404 are connected via a hardwire connection (e.g., USB), and the cam device 404 may be powered via this hardwire connection. In some examples, the comm device 402 draws power from the vehicle's electrical system. Further, the AMS may include other sensors, such as any of the sensors 401. The AMS 210 is configured to communicate with any of the sensors 401 in the vehicle.

The sensors 401 are configured to monitor various parameters and states of the vehicle. In some examples, the sensors 401 include an engine speed sensor 422 that measures the revolutions per minute of the engine, temperature sensors 423 that measure various temperature points in the vehicle (e.g., cabin, engine, outside), and inertial sensors 424 that detect motion and orientation of the vehicle. The sensors 401 may also include an inward camera 425, an outward camera 426, a voltage sensor 427 that monitors the electrical system of the vehicle, and pressure sensors 428, which detect the pressure in various systems such as tires or hydraulic systems. Further, the sensors 401 may include radar sensors 429 and Light Detection and Ranging (LIDAR) sensors 430, which provide distance and mapping capabilities for the vehicle's surroundings. A speed sensor 431 measures the traveling speed of the vehicle, and fuel sensors 432 monitor the amount of fuel in the tank. The vehicle may also include an onboard diagnostics system 433 for self-diagnosis and reporting of the operational status of the vehicle 202.

Figure 9:
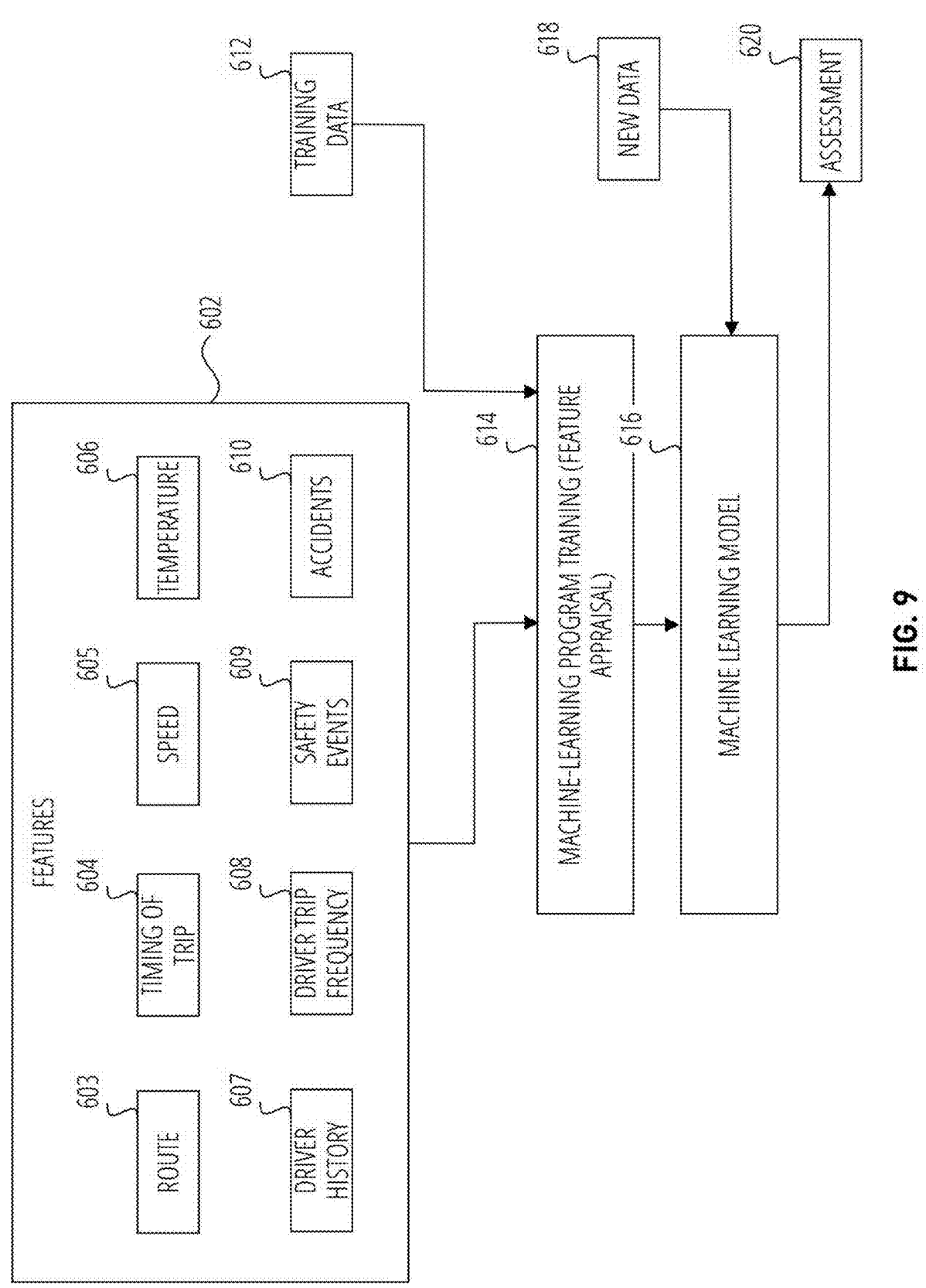
FIG. 9 illustrates training and use of an example of a machine learning model.

FIG. 9 illustrates training and use of an example of a machine learning model. In some examples, machine learning (ML) models 616 are utilized to validate certain vehicle inspection actions, such as to validate whether a captured image shows an object, or a viewpoint as specified by a corresponding inspection requirement.

Machine Learning (ML) is an application that provides computer systems the ability to perform tasks without explicitly being programmed by making inferences based on patterns found in the analysis of data. Machine learning explores the study and construction of algorithms, also referred to herein as tools, that may learn from existing data and make predictions about new data. Such machine-learning algorithms operate by building an ML model 616 from training data 612 in order to make data-driven predictions or decisions expressed as outputs or assessments 620. Although examples are presented with respect to a few machine-learning tools, the principles presented herein may be applied to other machine-learning tools.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm, using information that is neither classified nor labeled, and allowing the algorithm to act on that information without guidance. Unsupervised ML is useful in exploratory analysis because it can automatically identify structure in data.

Typical tasks for supervised ML are classification problems and regression problems. Classification problems, also referred to as categorization problems, aim to classify items into one of several category values (for example, is this object an apple or an orange?). Regression algorithms aim to quantify some items (for example, by providing a score to the value of some input). Some examples of commonly used supervised ML algorithms are Logistic Regression (LR), Naive-Bayes, Random Forest (RF), neural networks (NN), deep neural networks (DNN), matrix factorization, and Support Vector Machines (SVM).

Some typical tasks for unsupervised ML include clustering, representation learning, and density estimation. Some examples of commonly used unsupervised ML algorithms are K-means clustering, principal component analysis, and autoencoders.

In some examples, the ML model 616 provides a score indicating whether a captured image includes a required element or viewpoint (e.g., a number from 1 to 100).

The training data 612 comprises examples of values for the features 602. In some examples, the training data comprises labeled data with examples of values for the features 602 and labels indicating a validation.

The machine-learning algorithms utilize the training data 612 to find correlations among identified features 602 that affect the outcome. A feature 602 is an individual measurable property of a phenomenon being observed. The concept of a feature is related to that of an explanatory variable used in statistical techniques such as linear regression. Choosing informative, discriminating, and independent features is beneficial for the effective operation of ML in pattern recognition, classification, and regression. Features may be of different types, such as numeric, string, categorical, and graph. A categorical feature is a feature that may be assigned a value from a plurality of predetermined possible values (e.g., this animal is a dog, a cat, or a bird).

In one example, the features 602 may be of different types and may include one or more of segmentation data from a captured image, image metadata, an image color profile, and image resolution, etc.

Such features can be used individually or in combination to train the machine learning model to determine the accuracy of a captured image. It is noted that these features are examples and do not describe every possible embodiment. Other implementations may utilize different parameters, fewer parameters, additional parameters, combine parameters, etc. The examples illustrated in FIG. 6 should therefore not be interpreted to be exclusive or limiting, but rather illustrative.

During training 614, the ML program, also referred to as ML algorithm or ML tool, analyzes the training data 612 based on identified features 602 and configuration parameters defined for the training. The result of the training 614 is the ML model 616, which is capable of taking inputs (e.g., an image) to produce an assessment.

Training an ML algorithm involves analyzing large amounts of data (e.g., from several gigabytes to a terabyte or more) in order to find data correlations. The ML algorithms utilize the training data 612 to find correlations among the identified features 602 that affect the outcome or assessment 620. In some examples, the training data 612 includes labeled data, which is known data for one or more identified features 602 and one or more validations, e.g., that a captured image contains a specified object or object viewpoint.

The ML algorithms usually explore many possible functions and parameters before finding what the ML algorithms identify to be the best correlations within the data; therefore, training may make use of large amounts of computing resources and time.

When the ML model 616 is used to perform an assessment, new data 618 is provided as input to the ML model 616, and the ML model 616 generates the assessment 620 as output. For example, when a vehicle image is provided (e.g., an image captured via the mobile device 104 during a vehicle inspection), the ML model 616 can provides an indication of whether the image shows an object or viewpoint of the object specified by the inspection report.

In some examples, results obtained by the model 616 during operation (e.g., assessment 620 produced by the model in response to inputs) are used to improve the training data 612, which is then used to generate a newer version of the model. Thus, a feedback loop is formed to use the results obtained by the model to improve the model.

Figure 10:
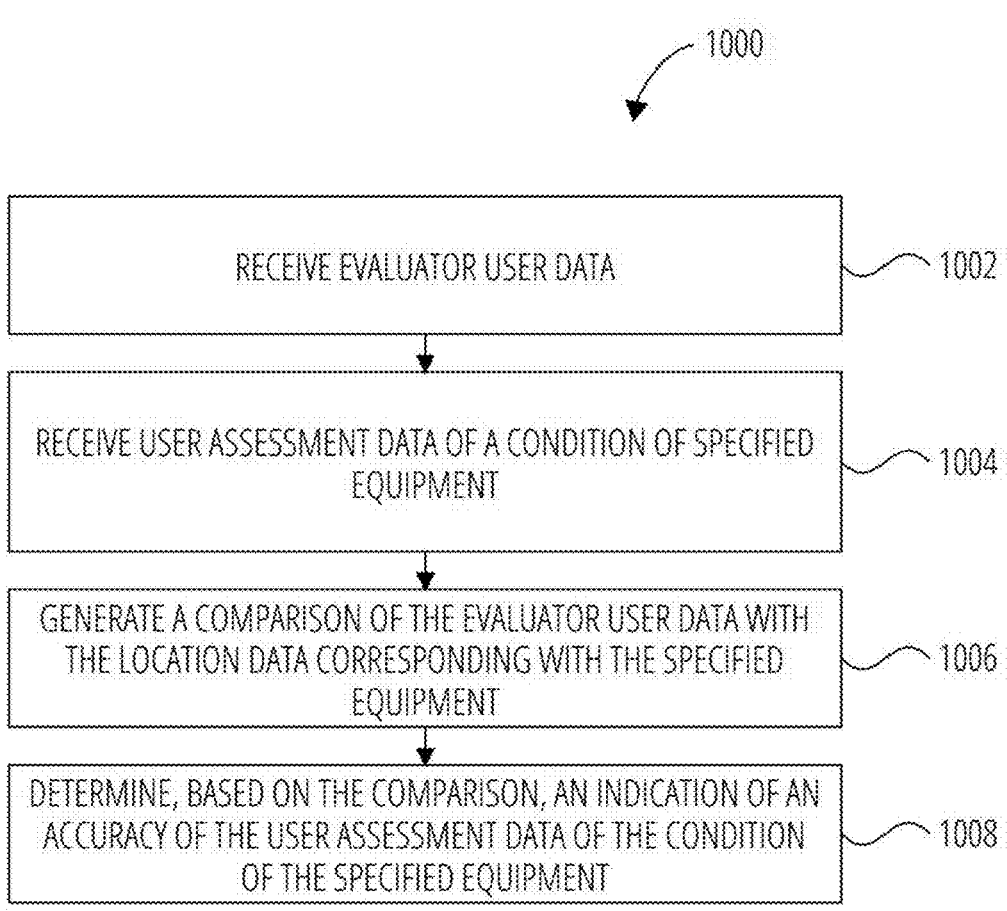
FIG. 10 is a flowchart showing a process for validating user assessment of equipment.

FIG. 10 is a flowchart showing a process 1000 for validating user assessment of equipment.

The process 1000 begins at step 1002 where the system receives evaluator user data, including a present location of an evaluator device and at least one evaluator credential. The evaluator device typically comprises a mobile device such as a smartphone or tablet carried by the equipment inspector, and the evaluator credentials may include information identifying the inspector's qualifications, certifications, or authorization to perform inspections on the specified type of equipment.

At step 1002, the process 1004 involves receiving user assessment data of a condition of specified equipment, including multimedia of the specified equipment and location data corresponding with the specified equipment. The multimedia content typically includes photographs or video recordings captured during the inspection process, while the location data represents the known geographical coordinates or position of the equipment being inspected, which may be obtained through telematics systems or other location tracking technologies.

The process 1000 proceeds to step 1006, a comparison of the evaluator user data is generated with the location data corresponding with the specified equipment. This comparison process involves analyzing the present location of the evaluator device against the known location of the specified equipment to determine spatial proximity and verify that the evaluator is physically present at the equipment location during the inspection process. As part of this step, the process 1000 can involve determining whether the user assessment data meets at least one data collection standard. These data collection standards serve as quality enforcement mechanisms to ensure inspection thoroughness and accuracy.

One exemplary data collection standard involves validating the recency of multimedia metadata corresponding with the multimedia content. The system specifically examines Exchangeable Image File Format (EXIF) files embedded within captured images to verify their freshness and prevent operators from reusing old photographs taken on previous days while sitting in an office. When users attempt to select photos from their device's photo library, the system accesses and analyzes the EXIF metadata to determine when the photo was actually taken, ensuring that only recently captured images are accepted for inspection documentation.

In an example, the presence of a specified item or a specified item viewpoint included in the multimedia content can be validated. For example, the process 1000 can include using a trained machine learning (ML) model, providing the multimedia as an input, to determine whether the specified item is present and whether the specified item is shown according to the specified item viewpoint. For example, if an operator is supposed to photograph the driver side of a vehicle but instead captures an image of the front of the truck, the system provides a warning that "the driver side is not visible in this photo."

The process 1000 can also include a walkaround path validation, e.g., based on receiving location data of the evaluator device corresponding with a period where the evaluator is capturing the multimedia. The process 1000 can involve interpolating the received location data to estimate an evaluator walkaround path during the capturing of the multimedia, addressing the requirement that proper vehicle inspections should include a complete walk-around inspection where the operator walks in a complete circle around their vehicle. Such an interpolation process tracks the evaluator's movement pattern using GPS data from their mobile device to ensure they physically traverse the equipment perimeter.

As part of the comparison process, the process 1000 can include mapping an image, included in the multimedia, across the evaluator walkaround path based on multimedia metadata corresponding with the multimedia. The process 1000 can involve determining whether the image was captured at or near an expected position along the walkaround path. This mapping and positioning analysis ensures that operators are physically present at the equipment location and are conducting a thorough inspection rather than remaining stationary or capturing images from inappropriate locations.

Finally, at step 1008, the process 1000 can involve determining, based on the comparison and data collection standard evaluations, an indication of an accuracy of the user assessment data of the condition of the specified equipment. This determination provides a comprehensive measure of confidence in the inspection data quality, taking into account location verification, multimedia recency validation, content accuracy assessment, and walkaround path compliance. The accuracy indication serves as a foundation for quality enforcement measures and can trigger alerts or notifications when inspection quality standards are not met, thereby addressing the widespread problem of "pencil whipping" where inspections are completed remotely without actual examination of the equipment.

Figure 11:
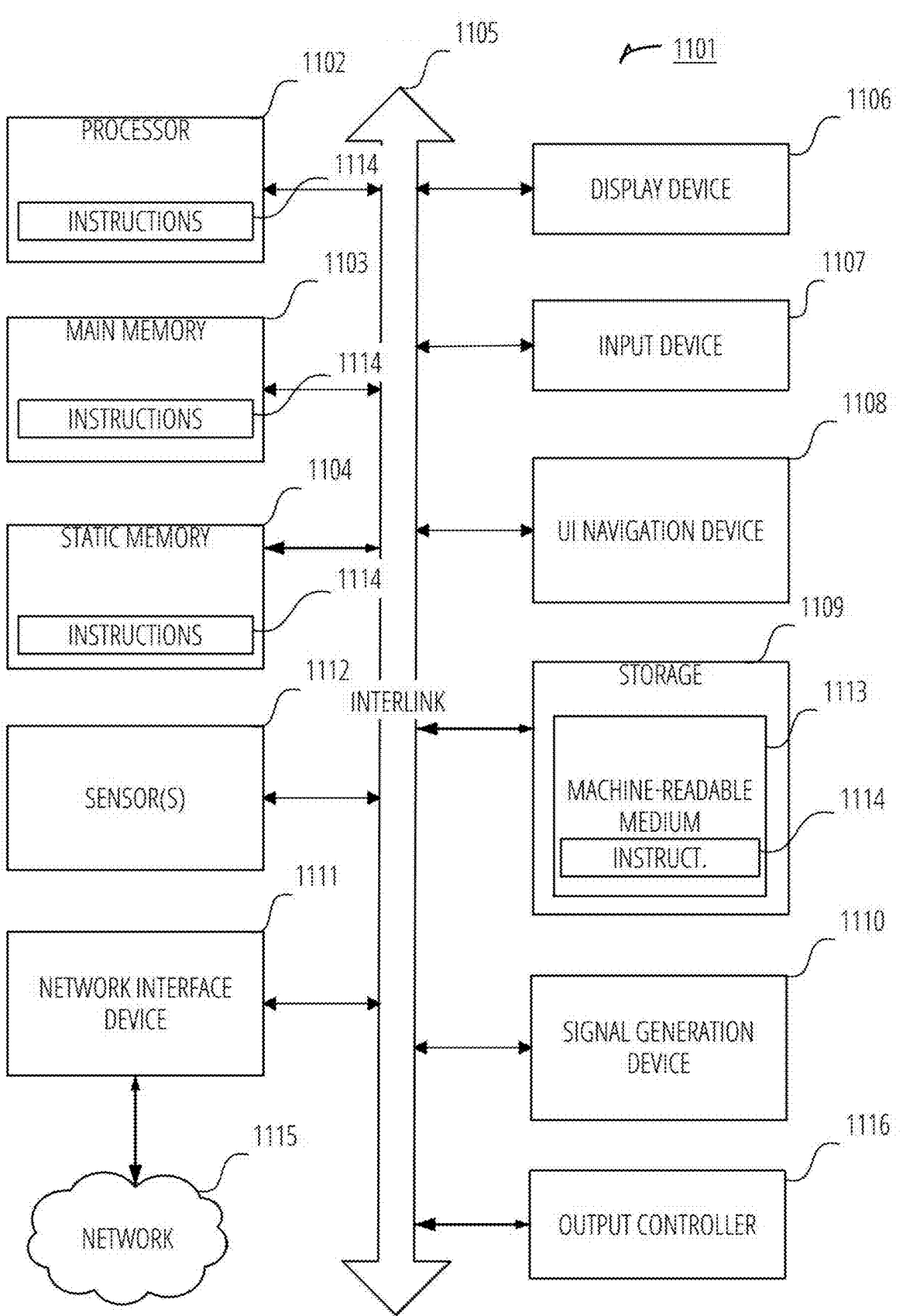
FIG. 11 is a block diagram of a machine.

FIG. 11 illustrates generally an example of a block diagram of a machine 1101 upon which any one or more of the techniques (e.g., methodologies) discussed herein may perform in accordance with some examples. In alternative embodiments, the machine 1101 may operate as a stand-alone device or may be connected (e.g., networked) to other machines. In a networked deployment, the machine 1101 may operate in the capacity of a server machine, a client machine, or both in server-client network environments. In an example, the machine 1101 may act as a peer machine in peer-to-peer (P2P) (or other distributed) network environment. The machine 1101 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (Saas), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 1101 may include a hardware processor 1102 (e.g., a central processing unit (CPU), a graphics processing unit (GPU), a hardware processor core, or any combination thereof), a main memory 1103 and a static memory 1104, some or all of which may communicate with each other via an interlink (e.g., bus) 1105. The machine 1101 may further include a display unit 1106, an alphanumeric input device 1107 (e.g., a keyboard), and a user interface (UI) navigation device 1108 (e.g., a mouse). In an example, the display unit 1106, alphanumeric input device 1107 and ui navigation device 1108 may be a touch screen display. The machine 1101 may additionally include a storage device (e.g., drive unit) 1109, a signal generation device 1110 (e.g., a speaker), a network interface device 1111, and one or more sensors 1112, such as a global positioning system (GPS) sensor, compass, accelerometer, or other sensor. The machine 1101 may include an output controller 1116, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1109 may include a machine readable medium 1113 that is non-transitory on which is stored one or more sets of data structures or instructions 1114 (e.g., software) embodying or utilized by any one or more of the techniques or functions described herein. The instructions 1114 may also reside, completely or at least partially, within the main memory 1103, within static memory 1104, or within the hardware processor 1102 during execution thereof by the machine 1101. In an example, one or any combination of the hardware processor 1102, the main memory 1103, the static memory 1104, or the storage device 1109 may constitute machine readable media.

While the machine readable medium 1113 is illustrated as a single medium, the term "machine readable medium" may include a single medium or multiple media (e.g., a centralized or distributed database, or associated caches and servers) configured to store the one or more instructions 1114.

The term "machine readable medium" may include any medium that is capable of storing, encoding, or carrying instructions for execution by the machine 1101 and that cause the machine 1101 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1114 may further be transmitted or received over a communications network 1115 using a transmission medium via the network interface device 1111 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1111 may include one or more physical jacks (e.g., Ethernet, coaxial, or phone jacks) or one or more antennas to connect to the communications network 1115. In an example, the network interface device 1111 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1101, and includes digital or analog communications signals or other intangible medium to facilitate communication of such software.

The following, non-limiting examples, detail certain aspects of the present subject matter to solve the challenges and provide the benefits discussed herein, among others.

Example 1 is a computer-implemented method, comprising: receiving evaluator user data, including a present location of an evaluator device and at least one evaluator credential; receiving user assessment data of a condition of specified equipment, including multimedia of the specified equipment and a location data corresponding with the specified equipment; generating a comparison of the evaluator user data with the location data corresponding with the specified equipment; and determining, based on the comparison, an indication of an accuracy of the user assessment data of the condition of the specified equipment.

In Example 2, the subject matter of Example 1 includes, determining whether the user assessment data meets at least one data collection standard.

In Example 3, the subject matter of Example 2 includes, wherein the at least one data collection standard includes one of a specified recency of multimedia metadata corresponding with the multimedia.

In Example 4, the subject matter of Example 3 includes, wherein the multimedia metadata includes an Exchangeable Image File Format (EXIF) file.

In Example 5, the subject matter of Examples 2-4 includes, wherein the at least one data collection standard includes a presence of a specified item or a specified item viewpoint, included in the multimedia.

In Example 6, the subject matter of Example 5 includes, using a trained machine learning (ML) model to, using the multimedia as an input, determine whether the specified item is present and whether the specified item or is shown according to the specified item viewpoint.

In Example 7, the subject matter of Examples 1-6 includes, receiving location data of the evaluator device corresponding with a period where the evaluator is capturing of the multimedia; and interpolating the received location data to estimate an evaluator walkaround path during the capturing of the multimedia.

In Example 8, the subject matter of Example 7 includes, wherein the comparison includes: mapping an image, including in the multimedia, across the evaluator walkaround path based on multimedia metadata corresponding with the multimedia; and determining whether the image was captured at or near an expected position along the walkaround path.

Example 9 is a computing apparatus comprising: a processor; and a memory storing instructions that, when executed by the processor, configure the apparatus to: receive evaluator user data, including a present location of an evaluator device and at least one evaluator credential; receive user assessment data of a condition of specified equipment, including multimedia of the specified equipment and a location data corresponding with the specified equipment; generate a comparison of the evaluator user data with the location data corresponding with the specified equipment; and determine, based on the comparison, an indication of an accuracy of the user assessment data of the condition of the specified equipment.

In Example 10, the subject matter of Example 9 includes, wherein the memory includes instructions to determine whether the user assessment data meets at least one data collection standard.

In Example 11, the subject matter of Example 10 includes, wherein the at least one data collection standard includes one of a specified recency of multimedia metadata corresponding with the multimedia.

In Example 12, the subject matter of Example 11 includes, wherein the multimedia metadata includes an Exchangeable Image File Format (EXIF) file.

In Example 13, the subject matter of Examples 10-12 includes, wherein the at least one data collection standard includes a presence of a specified item or a specified item viewpoint, included in the multimedia.

In Example 14, the subject matter of Example 13 includes, wherein the memory includes instructions to access a trained machine learning (ML) model to, using the multimedia as an input, determine whether the specified item is present and whether the specified item or is shown according to the specified item viewpoint.

In Example 15, the subject matter of Examples 9-14 includes, wherein the memory includes instructions to: receive location data of the evaluator device corresponding with a period where the evaluator is capturing of the multimedia; and interpolate the received location data to estimate an evaluator walkaround path during the capturing of the multimedia.

In Example 16, the subject matter of Example 15 includes, wherein the comparison includes: mapping an image, including in the multimedia, across the evaluator walkaround path based on multimedia metadata corresponding with the multimedia; and determining whether the image was captured at or near an expected position along the walkaround path.

Example 17 is a non-transitory computer-readable storage medium, the computer-readable storage medium including instructions that when executed by a computer, cause the computer to: receive evaluator user data, including a present location of an evaluator device and at least one evaluator credential; receive user assessment data of a condition of specified equipment, including multimedia of the specified equipment and a location data corresponding with the specified equipment; generate a comparison of the evaluator user data with the location data corresponding with the specified equipment; and determine, based on the comparison, an indication of an accuracy of the user assessment data of the condition of the specified equipment.

In Example 18, the subject matter of Example 17 includes, wherein the computer-readable storage medium includes instructions to determine whether the user assessment data meets at least one data collection standard.

In Example 19, the subject matter of Example 18 includes, wherein the at least one data collection standard includes one of a specified recency of multimedia metadata corresponding with the multimedia.

In Example 20, the subject matter of Example 19 includes, wherein the multimedia metadata includes an Exchangeable Image File Format (EXIF) file.

In Example 21, the subject matter of Examples 18-20 includes, wherein the at least one data collection standard includes a presence of a specified item or a specified item viewpoint, included in the multimedia.

In Example 22, the subject matter of Example 21 includes, wherein the computer-readable storage medium includes instructions to using a trained machine learning (ML) model to, using the multimedia as an input, determine whether the specified item is present and whether the specified item or is shown according to the specified item viewpoint.

In Example 23, the subject matter of Examples 17-22 includes, wherein the computer-readable storage medium includes instructions to: receive location data of the evaluator device corresponding with a period where the evaluator is capturing of the multimedia; and interpolate the received location data to estimate an evaluator walkaround path during the capturing of the multimedia.

In Example 24, the subject matter of Example 23 includes, wherein the comparison includes: mapping an image, including in the multimedia, across the evaluator walkaround path based on multimedia metadata corresponding with the multimedia; and determining whether the image was captured at or near an expected position along the walkaround path.

Example 25 is at least one machine-readable medium including instructions that, when executed by processing circuitry, cause the processing circuitry to perform operations to implement of any of Examples 1-24.

Example 26 is an apparatus comprising means to implement of any of Examples 1-24. Example 27 is a system to implement of any of Examples 1-24.

Example 28 is a method to implement of any of Examples 1-24.

The above Detailed Description can include references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that can include elements in addition to those listed after such a term in a claim are still deemed to fall within the scope of that claim.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that can include elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A computer-implemented method, comprising:
receiving evaluator user data, including a present location of an evaluator device and at least one evaluator credential;
receiving user assessment data of a condition of specified equipment, including multimedia of the specified equipment and a location data corresponding with the specified equipment;
generating a comparison of the evaluator user data with the location data corresponding with the specified equipment, wherein the comparison yields a determination of whether evaluator user data fulfills at least one specified recency requirement; and determining, based on the comparison, an indication of an accuracy of the user assessment data of the condition of the specified equipment.

2. The computer-implemented method of claim 1, comprising determining whether the evaluator user data includes a presence of a specified item or a specified item viewpoint, included in the multimedia.

3. The computer-implemented method of claim 2, comprising using a trained machine learning (ML) model to, using the multimedia as an input, determine whether the specified item is present and whether the specified item or is shown according to the specified item viewpoint.

4. The computer-implemented method of claim 1, comprising:

receiving location data of the evaluator device corresponding with a period where the evaluator is capturing of the multimedia; and interpolating the received location data to estimate an evaluator walkaround path during the capturing of the multimedia.

5. The computer-implemented method of claim 4, wherein the comparison includes:

mapping an image, including in the multimedia, across the evaluator walkaround path based on multimedia metadata corresponding with the multimedia; and determining whether the image was captured at or near an expected position along the walkaround path.

6. A computing apparatus comprising:

a processor; and a memory storing instructions that, when executed by the processor, configure the apparatus to:

receive evaluator user data, including a present location of an evaluator device and at least one evaluator credential;

receive user assessment data of a condition of specified equipment, including multimedia of the specified equipment and a location data corresponding with the specified equipment;

generate a comparison of the evaluator user data with the location data corresponding with the specified equipment, wherein the comparison yields a determination of whether evaluator user data fulfills at least one specified recency requirement; and determine, based on the comparison, an indication of an accuracy of the user assessment data of the condition of the specified equipment.

7. The computing apparatus of claim 6, wherein at least one data collection standard includes a presence of a specified item or a specified item viewpoint, included in the multimedia.

8. The computing apparatus of claim 7, wherein the memory includes instructions to access a trained machine learning (ML) model to, using the multimedia as an input, determine whether the specified item is present and whether the specified item or is shown according to the specified item viewpoint.

9. The computing apparatus of claim 6, wherein the memory includes instructions to:

receive location data of the evaluator device corresponding with a period where the evaluator is capturing of the multimedia; and interpolate the received location data to estimate an evaluator walkaround path during the capturing of the multimedia.

10. The computing apparatus of claim 9, wherein the comparison includes:

mapping an image, including in the multimedia, across the evaluator walkaround path based on multimedia metadata corresponding with the multimedia; and determining whether the image was captured at or near an expected position along the walkaround path.

11. A non-transitory computer-readable storage medium, the computer-readable storage medium including instructions that when executed by a computer, cause the computer to:

receive evaluator user data, including a present location of an evaluator device and at least one evaluator credential;

receive user assessment data of a condition of specified equipment, including multimedia of the specified equipment and a location data corresponding with the specified equipment;

generate a comparison of the evaluator user data with the location data corresponding with the specified equipment, wherein the comparison yields a determination of whether evaluator user data fulfills at least one specified recency requirement; and determine, based on the comparison, an indication of an accuracy of the user assessment data of the condition of the specified equipment.

12. The computer-readable storage medium of claim 11, wherein at least one data collection standard includes a presence of a specified item or a specified item viewpoint, included in the multimedia.

13. The computer-readable storage medium of claim 12, wherein the computer-readable storage medium includes instructions to using a trained machine learning (ML) model to, using the multimedia as an input, determine whether the specified item is present and whether the specified item or is shown according to the specified item viewpoint.

14. The computer-readable storage medium of claim 11, wherein the computer-readable storage medium includes instructions to:

receive location data of the evaluator device corresponding with a period where the evaluator is capturing of the multimedia; and interpolate the received location data to estimate an evaluator walkaround path during the capturing of the multimedia.

15. The computer-readable storage medium of claim 14, wherein the comparison includes:

mapping an image, including in the multimedia, across the evaluator walkaround path based on multimedia metadata corresponding with the multimedia; and determining whether the image was captured at or near an expected position along the walkaround path.

* * * * *